United States Patent [19]

Muraki et al.

[11] Patent Number: 5,107,730
[45] Date of Patent: Apr. 28, 1992

[54] WORKPIECE SPINDLE CONTROL UNIT AND CONTROL METHOD

[75] Inventors: Toshiyuki Muraki; Sumiaki Inami, both of Aichi, Japan

[73] Assignee: Yamazaki Mazak Kabushiki Kaisha, Aichi, Japan

[21] Appl. No.: 404,963

[22] Filed: Sep. 8, 1989

[30] Foreign Application Priority Data

Sep. 9, 1988 [JP] Japan .................................. 63-226090
Sep. 9, 1988 [JP] Japan .................................. 63-226091

[51] Int. Cl.⁵ .............................................. B23B 3/00
[52] U.S. Cl. ........................................ 82/118; 82/142; 82/1.11
[58] Field of Search ................. 82/142, 1.11, 118

[56] References Cited

U.S. PATENT DOCUMENTS

| | | | |
|---|---|---|---|
| 4,048,880 | 9/1977 | Link .................................... | 82/129 |
| 4,766,788 | 8/1988 | Yashiki et al. .................... | 82/142 |
| 4,926,723 | 5/1990 | Lothammer ...................... | 82/118 |

Primary Examiner—Bruce M. Kisliuk
Assistant Examiner—Lawrence Cruz
Attorney, Agent, or Firm—Wenderoth, Lind & Ponack

[57] ABSTRACT

A brake is provided for a workpiece spindle for spindle control. The generation of position shear of a workpiece spindle due to the unbalanced contact of the brake is prevented by changing the clamping power before and after the contact with the workpiece spindle. After the clamping of the workpiece spindle, the servo controlling state of the workpiece spindle motor is maintained and the overheat of the motor is prevented by limiting the torque of the workpiece spindle motor.

15 Claims, 6 Drawing Sheets

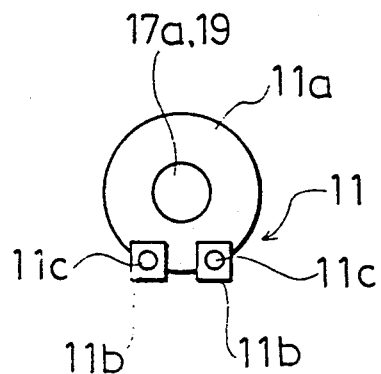
FIG. 2
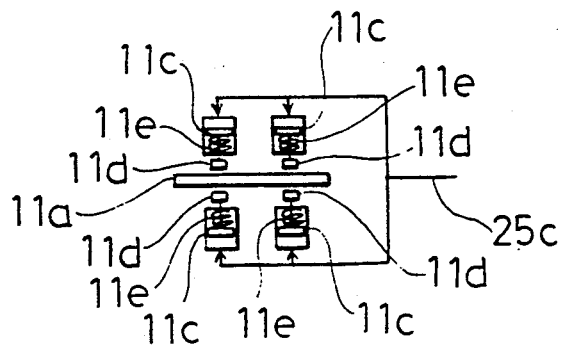
FIG. 3
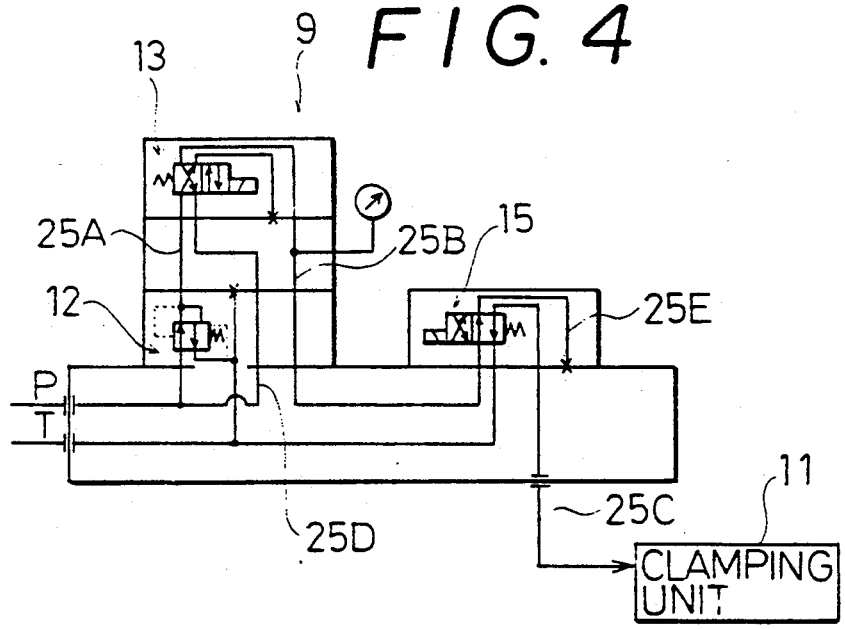
FIG. 4
FIG. 5
|   | SOL1 | SOL2 | CLAMP POWER |
|---|------|------|-------------|
| 1 | OFF  | OFF  | 0           |
| 2 | OFF  | ON   | STRONG      |
| 3 | ON   | OFF  | 0           |
| 4 | ON   | ON   | WEAK        |

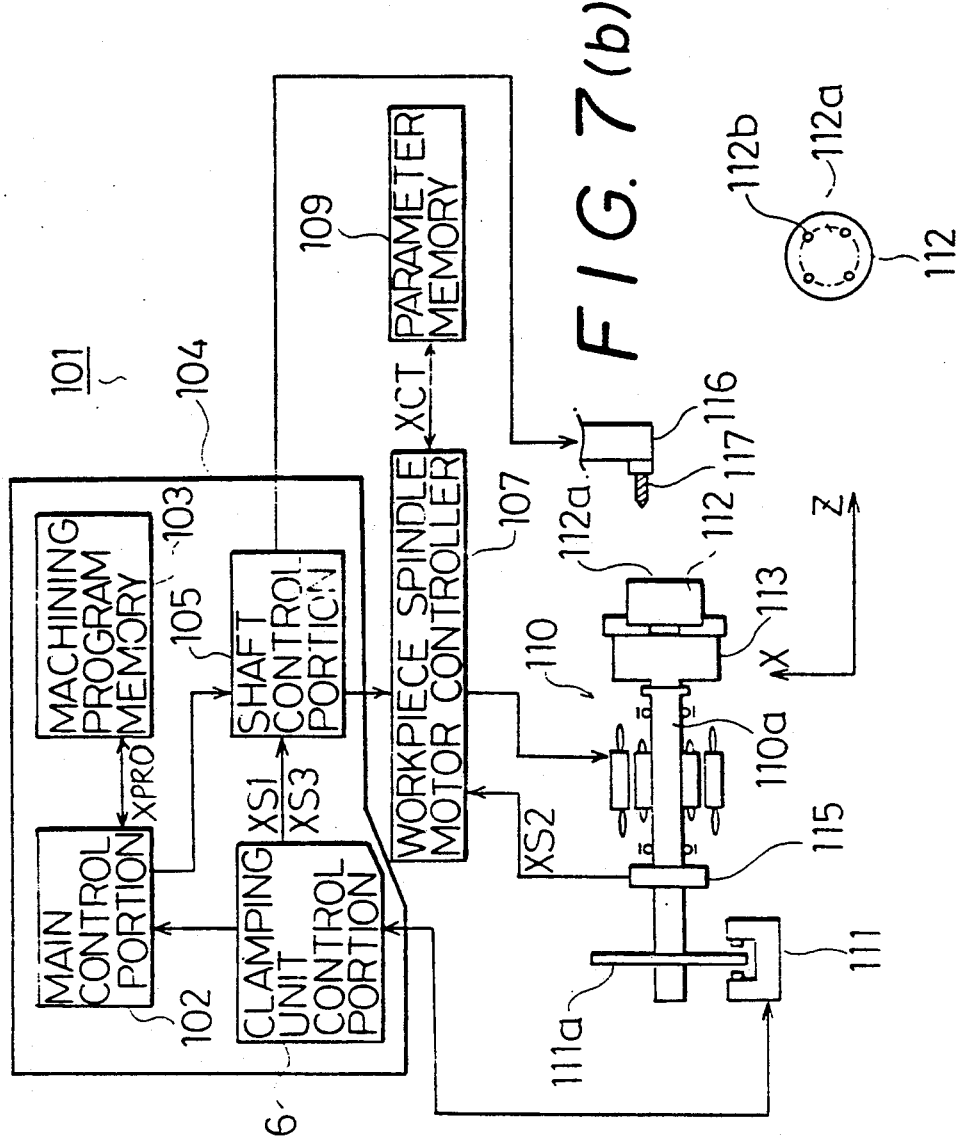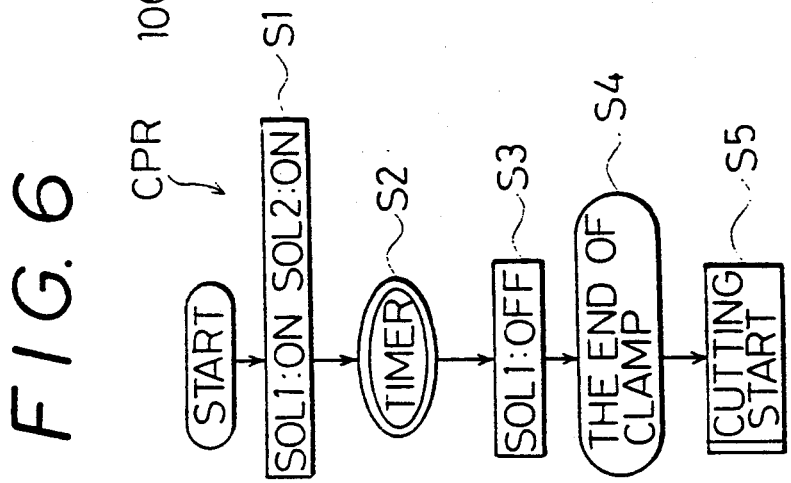

| CUTTING TYPE CV | DEPTH OF CUT F | HYDRAULIC POWER SWITCHING SIGNAL ZS |
|---|---|---|
| (1) "CUTTING WITH THE ROTATION SHAFT FIXED" | — | ZS1 |
| (2) "CUTTING WITH THE ROTATION SHAFT ROTATING" | A "ROUGH MACHINING (LONG DEPTH OF CUT)" | ZS2 |
| | B "FINISHING MACHINING (SHORT DEPTH OF CUT)" | ZS3 |
| (3) "INDEXING IN NO LOAD ONLY" | — | ZS4 |

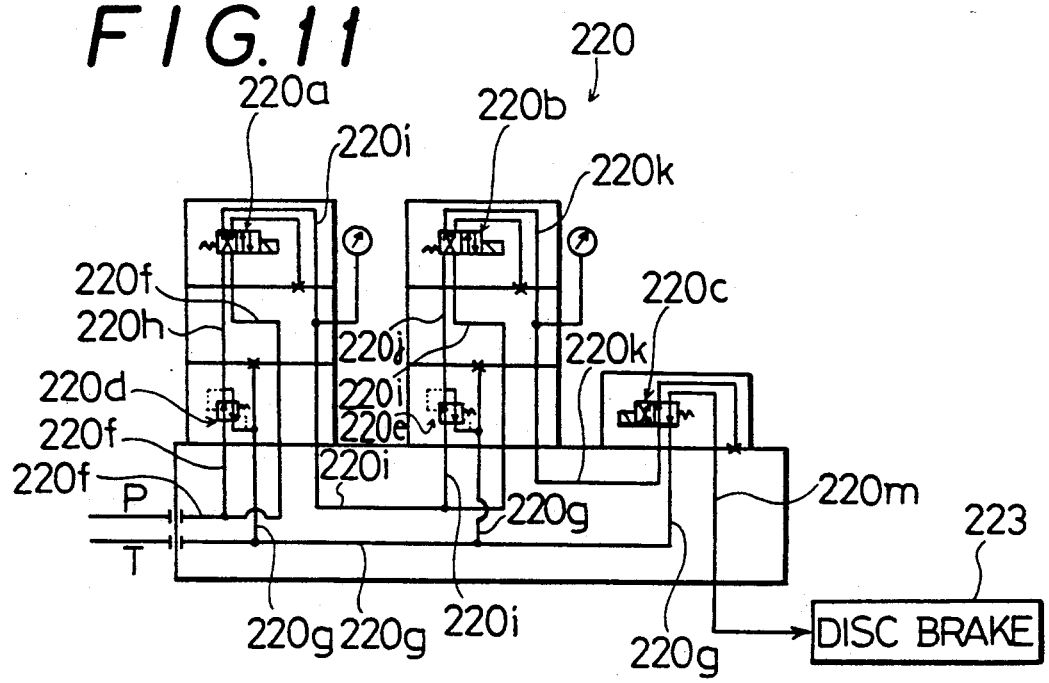

WORKPIECE SPINDLE CONTROL UNIT AND CONTROL METHOD

BACKGROUND OF THE INVENTION

The present invention relates to a workpiece spindle control unit and a control method suitable for application to a workpiece spindle capable of performing C-axis control machining with a workpiece held thereby.

It is known these days to be able to index a workpiece spindle at a high speed and high accuracy in C-axis control, in such a manner that a workpiece motor, and a workpiece spindle is directly rotated and driven by a workpiece spindle motor in a complex machining machine tool capable of performing turning and C-axis control machining.

In such a machine tool, a method of performing machining by fixing a workpiece spindle at a predetermined C-axis angular position, according to C-axis control, is frequently used in the case of milling and the like. In this case, a workpiece spindle is fixed by using a clamping means comprising a brake installed on the workpiece spindle. The workpiece spindle may be shifted from an angular position originally positioned by an unbalanced contact of brake friction pads during clamping, owing to the assembly accuracy of the clamping unit. This results in deterioration of the machining accuracy. In the clamping with a clamping unit, when a spindle driving motor, that is, a workpiece spindle, is clamped driving a position loop in servo-control, excessive current flows in the motor in order to absorb the servo positioning error, and the motor overheats. This method is open to objections. It is thinkable to control by cutting the servo during clamping in order to prevent overheating. When a servo is cut, it is impossible to return to a correct C-axis position without performing an original reversion movement during unclamping. Moreover, such a method is also used that a rotation only signal is detected from a rotation detector side after the clamping of a motor, and the control according to the rotation signal isn't performed during clamping, but after unclamping of a motor. This control method needs complex control procedures such as switching of a servo between ON and OFF, and the chasing of a rotation signal. Therefore, it is inconvenient.

An object of the present invention is to provide a workpiece spindle control unit and its control method capable of clamping at a correct angular position.

A further object of the present invention is to provide a workpiece spindle control unit and its control method for which an origin reversion movement is unnecessary in unclamping of a spindle driving motor, and complex control procedures, such as the switching of a servo between ON and OFF, are also needless.

SUMMARY OF THE INVENTION

In accordance with the present invention, a workpiece spindle is provided. A clamping means, such as a clamping unit having a brake means such as plural brake friction pads capable of clamping the rotation of the workpiece spindle, is provided for the workpiece spindle. A clamp power adjusting means, such as a hydraulic power switching unit, is provided for the clamping means by steps. Accordingly, the positional shear of a workpiece spindle, due to the unbalanced contacting of brake means, can be prevented in such a manner that a clamping unit is driven with a clamp power at the beginning of clamping, at which point the clamping power of the brake means is unbalanced. Then, clamping can be correctly performed.

A supply of lubricating oil, such as a lubricating device, is connected with the clamping unit, so it is possible to considerably reduce the coefficient of friction between the brake means and the workpiece spindle. Therefore, the positional shear of the workpiece spindle due to the unbalanced contact by the brake means can be lessened.

With this arrangement the workpiece spindle is provided and a clamping means, such as a clamping unit having a brake means such as plural brake friction pads capable of clamping the rotation of the workpiece spindle, is provided for the workpiece spindle. When a workpiece spindle is clamped for C-axis control, brake contact is performed with a first clamp power until all brakes are contacted with the workpiece spindle, and with a second clamp power stronger than the first clamp power after all the brakes are in contact with the workpiece spindle. Accordingly, the positioning of the workpiece spindle can be performed without the positional shear of the workpiece spindle during C-axis control.

Further, according to the present invention, a workpiece spindle control unit comprises a workpiece spindle and a workpiece spindle motor directly connected with the workpiece spindle. A turning angle detector detects the turning angle of a workpiece spindle provided for the workpiece spindle. A servo control means, such as a workpiece spindle motor controller, controls the C-axis turning angle of the workpiece spindle motor according to a signal from the turning angle detector. A clamping means, such as a clamping unit for clamping the workpiece spindle and a clamping unit control portion, and a command means, such as an axis control portion, command the servo control means to reduce the torque of the workpiece spindle motor in comparison with the usual rating torque while the clamping means is clamping the rotation of the workpiece spindle. In case the workpiece spindle is clamped at a predetermined angular position for C-axis control, the torque of a workpiece spindle motor is reduced in comparison with its usual rating torque without releasing control of the workpiece spindle motor by the servo control means. Accordingly, there is no possibility of overheating the workpiece spindle motor, on the assumption that the workpiece spindle motor in the clamping state is driven and controlled by a servo control means on the basis of servo error. Since the servo control means can always be worked during the clamping of the workpiece spindle, an origin reversion movement is unnecessary, and complex control procedures, such as ON-OFF switching of a servo control, are also unnecessary when clamping and unclamping the workpiece spindle.

A workpiece spindle control unit comprises a workpiece spindle and a workpiece spindle motor directly connected with the workpiece spindle, a turning angle detector for detecting the turning angle of a workpiece spindle provided for the workpiece spindle, a servo control means such as a workpiece spindle motor controller for controlling the C-axis turning angle of the workpiece spindle motor according to the signal from the turning angle detector, and a clamping means, such as a clamping unit for clamping the workpiece spindle and a clamping unit control portion. When the workpiece spindle is fixed at a predetermined angular position in C-axis control, the workpiece spindle is clamped together with the workpiece spindle motor by driving the clamping means, and the control of the workpiece spindle motor is continued by the servo control means, and the torque of the workpiece spindle motor is reduced in comparison with the usual rating torque to prevent the overheat of the workpiece spindle motor. Accordingly, the workpiece spindle can be clamped while keeping the servo control ON by limitation of the torque of the workpiece spindle motor.

BRIEF DESCRIPTION OF THE DRAWINGS

FIG. 2 is a view in the direction of the arrow II of a clamping unit portion in FIG. 1;

FIG. 3 is a plan view of FIG. 2;

FIG. 4 is a hydraulic circuit diagram showing details of a hydraulic power switching unit;

FIG. 5 is a chart showing the control sequence of each valve;

FIG. 6 is a flowchart showing an example of a clamp control program.

FIG. 7(a) is a control block showing an example of a complex machine tool to which the present invention is applied and FIG. 7(b) is a view showing an example of a workpiece end face to be machined;

DESCRIPTION OF THE PREFERRED EMBODIMENTS

Figure 1:
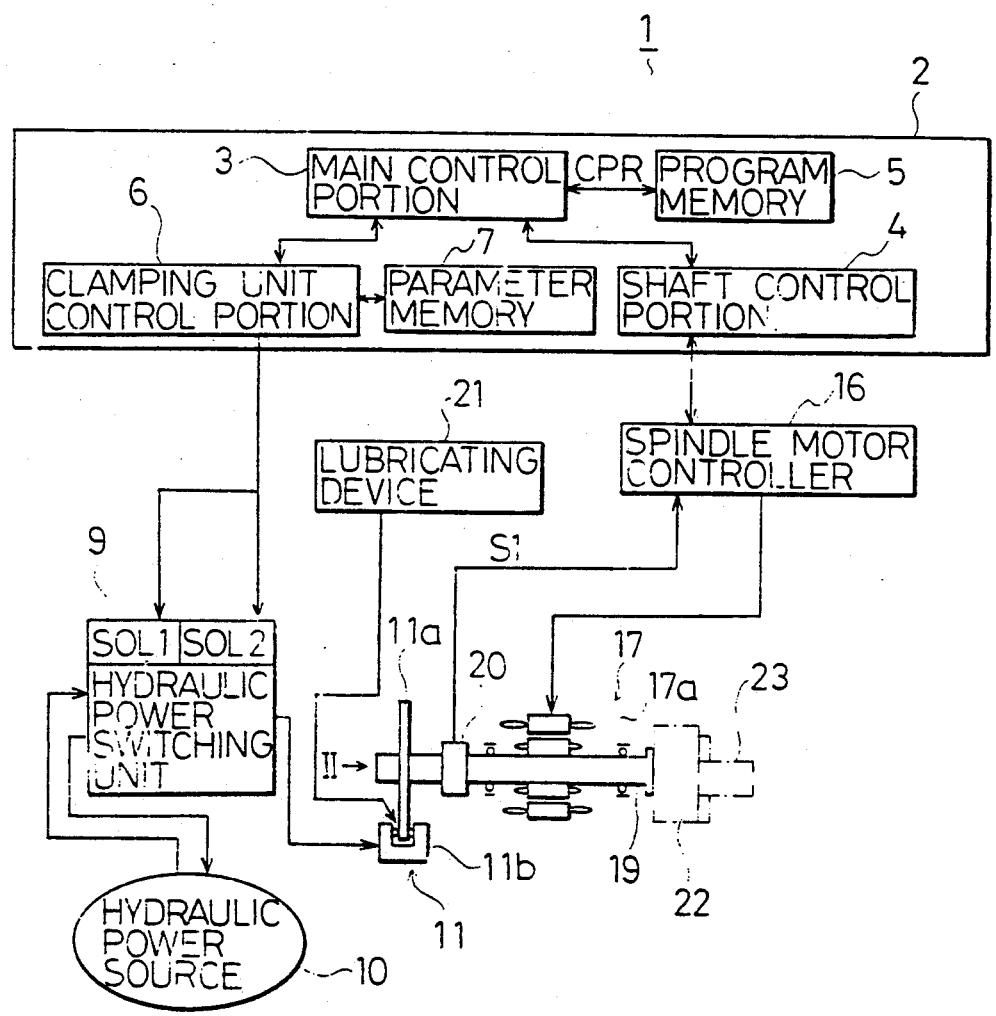
FIG. 1 is a control block diagram for showing an example of a complex machine tool to which the present invention is applied.

A complex machine tool 1 has an NC unit 2 as shown in FIG. 1. A main control portion 3 is provided for the NC unit 2. A program memory 5, a shaft control portion 4, a clamping unit control portion 6 and the like are provided for the main control portion 3. A parameter memory 7 and a hydraulic power switching unit 9 connect with the clamping unit control portion 6, and a hydraulic power source 10, such as a hydraulic pump, and a clamping unit 11 connect with the hydraulic power switching unit 9.

The hydraulic power switching unit 9 has a pressure reducing valve 12, a first solenoid valve 13, a second solenoid valve 15 and the like as shown in FIG. 4. The hydraulic power switching unit 9 connects with the hydraulic power source 10 on the side of the pressure reducing valve 12 and with the clamping unit 11 on the side of the second solenoid valve 15. The clamping unit 11 has a brake disc 11a fixed in a workpiece spindle described later, as shown in FIGS. 2 and 3. Two clamping units 11b are provided on the circumference of the brake disc 11a in the shape of inserting the brake disc 11a between both sides of each unit. The body of each unit 11b is U-formed as shown in FIG. 1. Two hydraulic cylinders 11c are provided for each body 11b, with the brake disc 11a between them. A brake friction pad 11d is provided for each hydraulic cylinder 15c, being free to contact the brake disc 11a.

A spindle motor controller 16 connects with the shaft control portion 4. A spindle motor 17 connects with the spindle motor controller 16. An output shaft 17a is provided for the spindle motor 17, being directly connected with a workpiece spindle 19. A turning angle detector 20 connected with the spindle motor controller 16 is installed on the output shaft 17a. A chuck 22 is installed on the workpiece spindle 19. The chuck 22 can hold a workpiece 23. A lubricating device 21 connects with the clamping unit 11 so as to supply the brake disc 11a with lubricating oil.

With the above-described constitution of a complex machine tool 1, in a case where normal turning is performed on a workpiece 23, the spindle motor 17 is rotated at a predetermined rotational number (speed) while holding the workpiece 23 with the chuck 22 as shown in FIG. 1. A predetermined machining is then performed on the workpiece 23 by means of a turning tool such, as a cutting tool. In case a machining is performed with C-axis control, and the workpiece spindle 19 is clamped with the clamping unit 1 to be positioned at a predetermined angle, the main control portion 3 reads out a clamp control program CPR from the program memory 5 and drives and controls the clamping unit 11 on the basis of the clamp control program CPR.

That is, the first solenoid valve 13 and the second solenoid valve 15 of the hydraulic power switching unit 9 are both changed from "off condition" to "on condition" at the step S1 according to the clamp control program CPR as shown in FIG. 6. Then, the pressure reducing valve 12 reduces the oil pressure from the hydraulic power source 10 to a predetermined pressure. Each hydraulic cylinder 11c of the clamping unit 11 is supplied with the reduced pressure oil via a line 25A, the first solenoid valve 13, a line 25B, the second solenoid valve 15 and a line 25C. Each hydraulic cylinder 11c is supplied with oil in which the pressure has been reduced by the pressure reducing valve 12. Then, each hydraulic cylinder 11c slowly moves its brake friction pad 11d in the direction of the brake disc 11a to start contact with the brake disc 11a.

The clamping unit control portion 6 keeps the first solenoid valve 13 and the second solenoid valve 15 ON up to the passage of predetermined time at the step S2 of the clamp control program CPR, and waits until all the brake friction pads 11d of the four hydraulic cylinders 11c of the clamping unit 11 come into contact with the brake disc 11a. Thus four brake friction pads 11d come into contact with the brake disc 11a slowly. Therefore, although small time differences result from assembly errors and the like in the timing of the start of contact, four brake friction pads 11d are contacted with the brake disc 11a in an equal condition after the passage of a predetermined amount of time. Moreover, since the brake disc 11a is always supplied with lubricating oil from the lubricating device 21, the coefficient of friction between the brake friction pad 11d and the brake disc 11a is sharply lowered by the action of the lubricating oil. In a case where, by unbalanced contact of the brake friction pads 11d, torque acts so that the brake disc 11a may rotate in either direction, there is a considerable reduction in the torque. Therefore, there is little positional shear during clamping. The output shaft 17a, that is, the workpiece shaft 19, is free to move without difficulty by the action of the lubricating oil until the four brake friction pads 11d come into contact with the brake disc 11a with predetermined pressure. On the assumption that the workpiece spindle 19 shifts to some angle due to the unbalanced contact of the brake friction pads 11d, the spindle motor controller 16 immediately drives the spindle motor 17 in a correcting direction toward the shear according to the turning angle detecting signal S1 from the turning angle detector 20. Accordingly, the shear due to the unbalanced contact of the brake friction pads 11d is corrected and the workpiece spindle 19 is clamped by the clamping unit 11.

When the brake disc 11a is slowly clamped by four hydraulic cylinders 11c in this way, the clamp control program CPR proceeds to the step S3 and the first solenoid valve 13 is switched from ON to OFF. Then, each hydraulic cylinder 11c of the clamping unit 11 is supplied with the oil pressure from the hydraulic power source 10 with the oil highly pressured via the line 25D, the first solenoid valve 13, the line 25B, the second solenoid valve 15 and the line 25C, bypassing the pressure reducing valve 12. Each hydraulic cylinder 11c transfers from clamping the brake disc 11a with low pressure to clamping with high pressure. The brake disc 11a is then securely held by the four brake friction pads 11d (the step S4 of the clamp control program CPR).

When the workpiece spindle 19 is held by the clamping unit 11 in this way, a predetermined machining is performed on a workpiece 23 held by the chuck 22 by means of a turning tool (the step S5 of the clamp control program CPR). On this occasion, since the workpiece 23 is correctly positioned at a predetermined angular position on C-axis, machining is performed with high accuracy.

When machining finishes, the second solenoid valve 15 of the hydraulic power switching unit 9 is switched from ON to OFF to drain the pressure oil of the clamping unit 11. Then, the brake friction pad 11d of each hydraulic cylinder 11c leaves the brake disc 11a by the action of a built-in retaining spring 11e. The spindle motor 17, that is, the workpiece spindle 19 is then free to rotate.

The clamping power of the clamping unit 11, according to the ON-OFF state of the first solenoid valve 11, according to the second solenoid valve (SOL2) 15 of the hydraulic power switching unit 9, is shown in FIG. 5.

The above-described embodiment concern a machine tool in which the workpiece spindle 19 is directly connected with the spindle motor 17. However, in the present invention, any machine tool is available, in addition to a directly-connected type machine tool, as described heretofore.

Another embodiment of the present invention will be explained according to FIG. 7 hereinafter.

A complex machining machine tool 101 has a main control portion 102 comprising an NC unit 104 as shown in FIG. 7 (a). A machining program memory 103, a shaft control portion 105, a clamping unit control potion 106 and the like connect with the main control portion 102. A workpiece spindle motor controller 107 connects with the shaft control portion 105 and a parameter memory 109 and a workpiece spindle motor 110 connects with the workpiece spindle motor controller 107. A clamping unit 111 connects with the clamping unit control portion 106.

The workpiece spindle motor 110 has an output shaft formed as a workpiece spindle 110a. A chuck 113 for holding a workpiece 112 to be machined is installed on the right end portion of the workpiece spindle 110a in the figure. A turning angle detector 115 is provided at the left end portion of the workpiece spindle 110a, being connected with the workpiece spindle motor controller 107. A clamp disc 111a comprising the clamping unit 111 is fixed on the workpiece spindle 110a. A tool rest 116 is provided on the right side of the chuck 113 in FIG. 7, being movable and drivable in the X-axis and Z-axis directions. Turning tools 117, such as a milling cutter and a drill, are attachably and detachably installed in the tool rest 116.

With the above-described constitution of the complex machining machine tool 101, in a case where drill holes 112b are formed at an end face 112a of the workpiece 112, installed in the chuck 113 at a predetermined angle pitch, by means of the turning tool 117 such as a drill, as shown in FIG. 7(b), the main control portion 102 reads out a machining program XPRO corresponding to the workpiece 112 from the machining program memory 103, and machining is performed on the workpiece 112 on the basis of the commands of the machining program XPRO. That is, in the machining program XPRO, it is commanded to position the workpiece spindle at a C-axis position, $\Theta = 45°$ by rapid feeding at a step of N100, which is a sequence number (G00C45). The shaft control portion 105 performs C-axis control on the workpiece spindle motor 11 via the workpiece spindle motor controller 107 according to the command to position the workpiece spindle 110a at the position, ($\Theta = 45°$) at which a drill hole 112b is formed at first. This operation is executed between a first time T1 and a second later time T2.

When the workpiece spindle has its C-axis positioned at the position $\Theta = 45°$ at the time T2 in this way, the machining program outputs a control code M210 at a sequence number N101, and commands the clamping unit control portion 106 to clamp the workpiece spindle 110a. Then, the clamping unit control portion 106 drives the clamping unit position $\Theta = 45°$ by clamping the clamp disc 111a at a time T23. At this point, the clamping power of the clamping unit 111 is controlled according to the clamp control program CPR as shown in FIG. 6, as described before, to clamp the workpiece spindle 110a. When the workpiece spindle 110a is clamped at the C-axis position $\Theta = 45°$ by the clamping unit 111 in this way, a clamp finishing signal XS1 is outputted to the shaft control portion 105 commands the workpiece spindle motor controller 107 to limit the torque of the workpiece spindle motor 110. The workpiece spindle motor controller 107 receives this command, reads out a clamp current value XCT from the parameter memory 109 and limits the upper bounds of the driving current of the workpiece spindle motor 110 on the basis of the clamp current value XCT at a later time T3. The clamp current value XCT is about 5 per cent of the current value corresponding to the rating torque. Therefore, the torque of the workpiece spindle motor 110 is considerably limited in comparison with a workpiece spindle motor in its usual condition.

When the workpiece spindle motor 110 is positioned so that the workpiece spindle 110a may be $\Theta = 45°$, the workpiece spindle 110 oscillates bit by bit, with $\Theta = 45°$ as a center in for correction, so that $\Theta = 45°$ by servo positioning error. And, the workpiece spindle 110a is held so as to shift in $\pm$ direction of the C-axis to some degree (a few pulses) in comparison with $\Theta = 45°$ according to the clamping timing of the clamping unit 111. However, even in this clamping condition, a position servo loop comprised of the turning angle detector 115, the workpiece spindle motor controller 107 and the workpiece spindle motor 110 functions as usual. The C-axis position of the workpiece spindle 110a is always detected from the turning angle detector 115 and outputted to the workpiece spindle motor controller 107 as a position signal XS2. Driving current flows to the workpiece spindle motor 110 via the workpiece spindle motor controller 107 so as to correct the error between the position signal XS2 and Θ=45°, which is the command value. As long as the error doesn't shrink between the signal XS2 and the command value, the workpiece spindle motor controller 107 increases the driving current. However, when clamping the workpiece spindle 110a with the clamping unit 111, the upper bound of the driving current is considerably limited by the clamp current value XCT is described before. Therefore, even if the workpiece spindle motor controller 107 increases the driving current to the workpiece spindle motor 110, there is no possibility of increasing it more than the clamp current value XCT. As a result, no excessive torque acts on the workpiece spindle motor 110 and the workpiece spindle motor 110 doesn't overheat.

The shaft control portion 105 drives the tool rest 116 according to sequence numbers N102 and N103 of the machining program such that the torque of the workpiece spindle motor 110 is limited between time T3 and later time T45. Machining is performed o the workpiece 112 to form the drill hole 112b at the position Θ=45° between a time T34 and another time T4.

When machining the turning tool 117 by of the drill hole 112b is finished in this way, the shaft control portion 105 commands the workpiece spindle motor controller 107 to release the limitation of torque. The workpiece spindle motor 110 releases the setting of the clamp current value XCT used at time T45 and the workpiece spindle motor 11 recovers to a normal condition. The machining program XPRO proceeds to a sequence number N104. The clamping unit control portion 106 unclamps the clamping unit III according to a control code M212 and releases the clamping condition of the workpiece spindle 110a at a time T5. When an unclamping signal XS3 is outputted to the shaft control portion 105 for indicating the release of the clamping of the workpiece spindle 110a, the shaft control portion 105 proceeds to a sequence number N105 of the machining program XPRO and proceeds to rapid feeding and positioning movements in order to position the workpiece spindle 110a and the workpiece 112 at the C-axis position Θ=135° for machining of a drill hole 112b at a time T6. Since the workpiece spindle motor 110 is driven in such that the limitation by the clamp current value XCT is released, rapid feeding and positioning movements are smoothly performed. Even when clamping the workpiece spindle 110a by the clamping u it 111, the servo loop of the workpiece spindle motor 110 continues to work via the turning angle detector 115 and the workpiece spindle motor controller 107. Accordingly, the workpiece spindle motor controller 107 always recognizes the present C-axis position of the workpiece spindle 110a. Therefore, it is possible to proceed to the next C-axis positioning movement immediately, without an origin recovering movement, when the clamping unit 111 is unclamped.

Where normal turning is performed by using the complex machining machine tool 101, the workpiece spindle motor 110 is rotated at a predetermined rotation number and the workpiece 112 held by the chuck 113 is machined by tools for turning on the tool rest 116.

Moreover, an example of a rotation axis control unit for a machine tool will be explained according to FIGS. 8 through 10 hereinafter.

Figure 8:
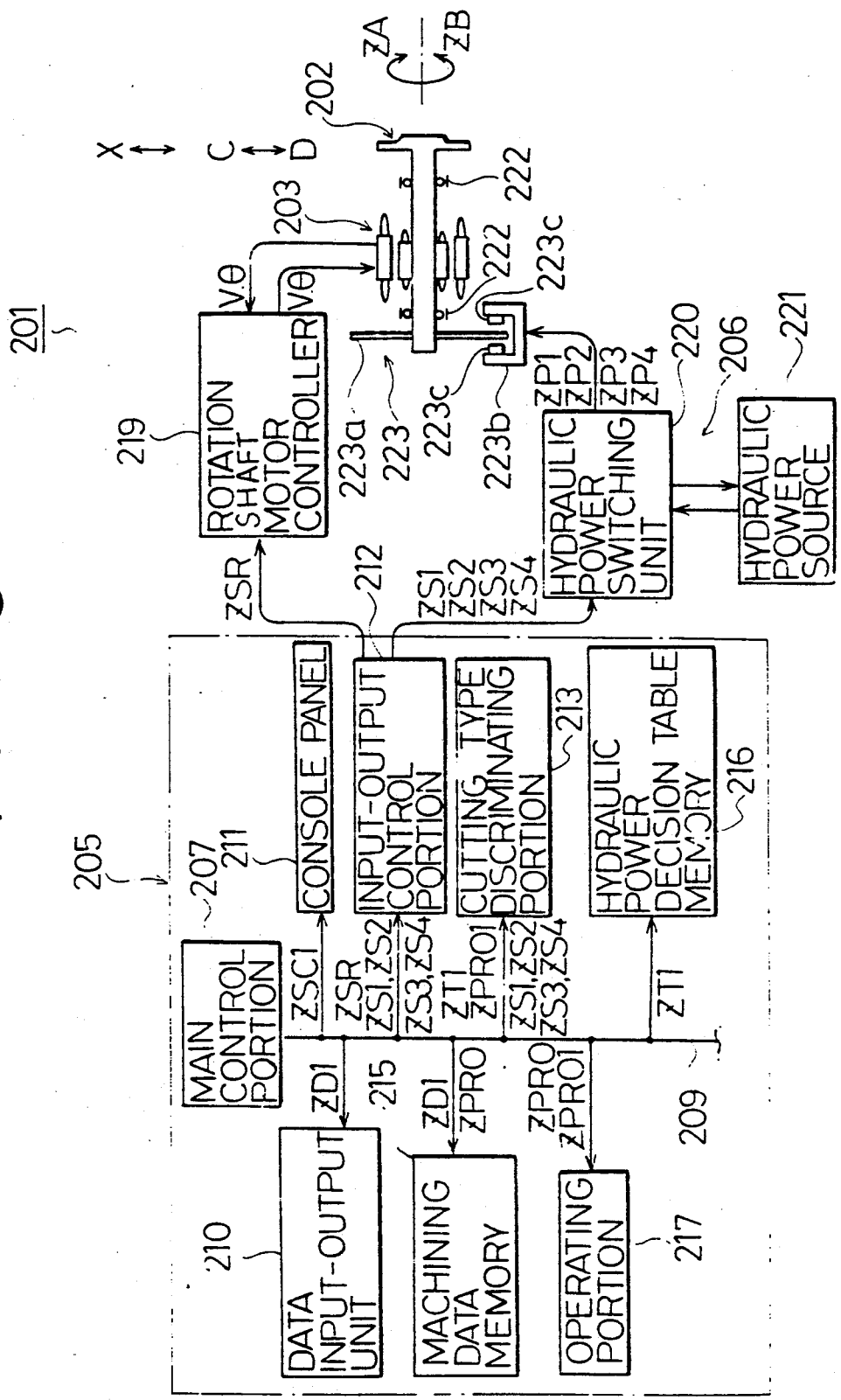
FIG. 8 is a chart showing an example of a machine tool to which an example of a rotation shaft control unit for a machine tool is applied.

A machine tool 201 capable of performing C-axis control, such as a lathe, has a rotation shaft 202, a driving motor 203, an NC unit 205, a rotation shaft control unit 206 and the like as shown in FIG. 8. The NC unit 205 has a main control portion 207. A data input-output unit 210, a console panel 211, an input-output control portion 212, a machining data memory 215, a cutting type discriminating portion 213 comprising the rotation shaft control unit 206, a hydraulic power decision table memory 216 an operating portion 217 and the like connect with the main control portion 207 via a bus line 209. A rotation shaft motor controller 219 and a hydraulic power switching unit 220, comprising the rotation shaft control unit 206, connect with the input-output control portion 212. A hydraulic power switching table ZT1 as shown in FIG. 10 is stored in the hydraulic power decision table memory 216. The kinds of hydraulic power switching signals ZS (for instance, ZS1, ZS2, ZS3, ZS4) which are outputted to the hydraulic power switching unit 220, as shown in FIG. 8, according to cutting types CV (for instance, CV1, CV2, CV3) are written in the hydraulic power switching table ZT1. A hydraulic power source 221 comprising a hydraulic pump, a drain tank and the like connects with the hydraulic power switching unit 220.

The rotation shaft 202, such as a spindle, is disposed on bearings 222 to be rotatable in the directions as shown by the arrows ZA and ZB as shown on the right side of FIG. 8. A workpiece can be installed on the rotation shaft 202 via a chuck (not shown). At the center portion of the rotation shaft 202 in the figure, the driving motor 203 is provided being built in with the rotation shaft 202. The rotation shaft motor controller 219 described before connects with the driving motor 203. A disc 223a of disc brake 223 is installed on the left end portion of the rotation shaft 202 in the figure. An engaging unit 223b of the disc brake 223 is provided below the rotation shaft 202, in the figure, so as to be able to hold the disc 223a with a predetermined power by means of pads 223c of the engaging unit 223b. The hydraulic power switching unit 220 described before connects with the engaging unit 223b.

Figures 9, 10:
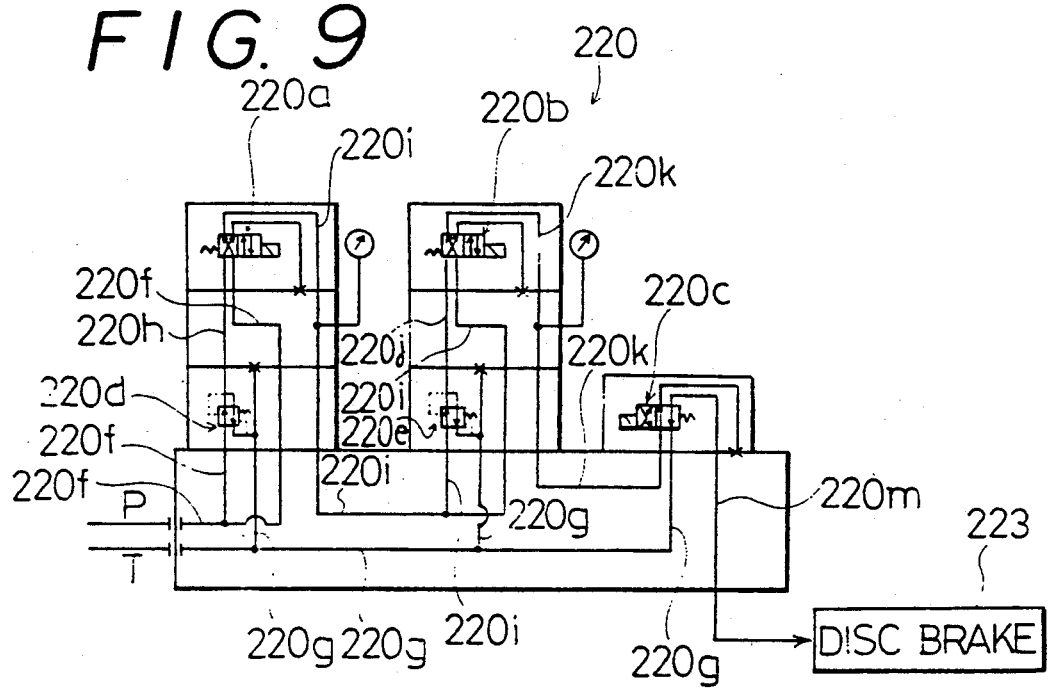
FIG. 9 is a diagram showing an example of a hydraulic circuit of a rotation shaft control unit as shown in FIG. 8.
FIG. 10 is a chart showing a hydraulic power decision table stored in a hydraulic power decision table memory of a rotation axis control unit for a machine tool.

The hydraulic power switching unit 220 has a first directional control valve 220a, a second directional control valve 220b, a third directional control valve 220c, a first pressure reducing valve 220d, a second pressure reducing valve 220e, and the like as shown in FIG. 9. The first pressure reducing valve 220d connects with the first directional control valve 220a via a line 220h. A hydraulic pump (not shown) of the hydraulic power source 221 as shown in FIG. 8 connects with the first pressure reducing valve 220d via a line 220f. The hydraulic pump directly connects with the first directional control valve 220a as shown in FIG. 9 via the line 220f. The second pressure reducing valve 220e connects with the first directional control valve 220a via a line 220i, and the second directional control valve 220b connects with the second pressure reducing valve 220e via a line 220j.

The second directional control valve 220b directly connects with the first directional control valve 220a via the line 220i. And, the third directional control valve 220c connects with the second directional control valve 220b via a line 220k. A drain tank (not shown) of the hydraulic power source 221 as shown in FIG. 8 connects with the third directional control valve 220c via a line 220g. And, the engaging unit 223b of the disc brake 223 as shown in FIG. 8 connects with the third directional control valve 220c as shown in FIG. 9 via a line 220m.

With the above-described constitution of the machine tool 201, in order to perform milling with C-axis control on a workpiece by using the machine tool 201, a workpiece (not shown) to be machined is installed on the rotation shaft 202 as shown in FIG. 8 by a chuck and the like. In this state, a worker inputs machining data ZD1 (for instance, the X-axis coordinate values X1, X2 of the machining starting point and the machining end point of a workpiece in the directions as shown by the arrows C and D (the X-axis direction) in FIG. 8, the angular velocity V of the rotation shaft 202 and the like) via the data input-output unit 210 of the NC unit 205. Then, the data input-output unit 210 outputs those machining data ZD1 to the machining data memory 215. Receiving this, the machining data memory 215 stores the machining data ZD1 as a part of a machining program ZPRO.

When the machining program ZPRO is composed and stored in the machining data memory 215 in this way, a worker inputs a machining starting command ZSC1 via the console panel 211 as shown in FIG. 8. Receiving this, the main control portion 207 commands the operating portion 217 to compose an executable program ZPRO1, including the generation of a tool path. Then, the operating portion 217 reads out the machining program ZPRO stored in the machining data memory 215 and composes the executable program ZPRO1 on the basis of EIA-ISO code and the like according to the program ZPRO. Milling and the like are then performed with C-axis control on a workpiece according to the composed executable program ZPRO1.

That is, at first, the main control portion 207 of the NC unit 205 as shown in FIG. 8 outputs an indexing command ZSR to the rotation shaft motor controller 219 via the input-output control portion 212 as shown in FIG. 8 so that the rotation shaft 202 may be positioned at a position with a predetermined angle to the C-axis origin (the C-axis origin is not shown) in order to execute the steps of the executable program ZPRO1 composed by the operating portion 217 in order. Then, the rotation shaft motor controller 219 rotates the driving motor 203 (that is, the rotation shaft 202) at a predetermined angular velocity V in the directions as shown by the arrows ZA and ZB with a rotation angle quantity Θ to position the rotation shaft 202 at the position with a predetermined angle to the C-axis origin.

In cases where the main control portion 207 as shown in FIG. 8 outputs the indexing command ZSR to the rotation shaft motor controller 219, the cutting type discriminating portion 213 reads out the executable program ZPRO1 from the operating portion 217 and determines that the cutting type CV to be performed from now on is CV3 as shown in FIG. 10, that is, (3) "indexing in no load only" from the control code of the step indicated by the program ZPRO1. The cutting type discriminating portion 213 as shown in FIG. 8 reads out the hydraulic power decision table ZT1 from the hydraulic power decision table memory 216 and outputs the hydraulic power switching signal ZS4 corresponding to (3) "indexing in no load only", that is, in cases where the cutting type CV is CV3, the signal ZS4 is output to the hydraulic power switching unit 220, as shown in FIG. 8, by retrieving the read hydraulic power decision table ZT1 as shown in FIG. 10.

The hydraulic power switching signals ZS corresponding on the cutting types CV are indicated in the hydraulic power decision table ZT1 as shown in FIG. 10. When the cutting type CV is CV1, that is, (1) "cutting with the rotation shaft fixed", ZS1 is indicated as the hydraulic power switching signal ZS. Where the cutting type CV is CV2, that is, (2) "cutting with the rotation shaft rotating" and A. "rough machining (long depth of cut)" F1, ZS2 is indicated as the hydraulic power switching signal ZS. Where the cutting type CV is CV2, that is, (2) "cutting with the rotation shaft rotating" and B. "finishing machining (short depth of cut)" F2, ZS3 is indicated a the hydraulic power switching signal ZS. Where the cutting type CV is CV3, that is, (3) "indexing in no load only", ZS4 is indicated as the hydraulic power switching signal ZS. Accordingly, the cutting type discriminating portion 213 can obtain the hydraulic power switching signal ZS according to the determined cutting type CV by retrieving the hydraulic power decision table ZT1.

Then the hydraulic power switching unit 220 as shown in FIG. 8 stops the drive of all of the first, second and third directional control valve 220a, 220b and 220c as shown in FIG. 9 on the basis of the hydraulic power switching signal ZS4. The connection between the lines 220f and 220m is 220c, and the engaging unit 223b of the disc brake 223 as shown in FIG. 8 isn't supplied with oil pressure from the line 220f. Accordingly, the pressure value ZP of oil pressure supplying the engaging unit 223b is ZP4 (=O). Therefore, the pads 223c of the engaging unit 223b don't hold the disc 223a. As a result, the indexing of the rotation shaft 202 on the basis of the executable program ZPRO1 is performed with high speed and high accuracy, since the rotation of the rotation shaft 202 in the directions as shown by the arrows ZA and ZB isn't limited by the disc brake 223, and the rotation shaft 202 is directly rotated and driven by the driving motor 203 without a speed reducer.

Where milling is performed on a workpiece with C-axis control, with the rotation shaft 202 fixed after an indexing operation, in order to form a key way and the like on a workpiece, the main control portion 207 as shown in FIG. 8 commands a tool rest portion (not shown) to cut a workpiece with the rotation shaft 202 fixed on the basis of the executable program ZPRO1. When the command is outputted to a tool rest control portion and the like, the cutting type discriminating portion 213 determines that the cutting type CV to be performed from now on is CV1 as shown in FIG. 10, that is, (1) "cutting with the rotation shaft 202 fixed", on the basis of the executable program ZPRO1 read out from the operating portion 217. Furthermore, the cutting type discriminating portion 213 as shown in FIG. 8 obtains the hydraulic power switching signal ZS corresponding to the determined cutting type CV1, that is, ZS1, by retrieving the hydraulic power decision table ZT1 read out from the hydraulic power decision table memory 216 as shown in FIG. 10, and outputs the obtained hydraulic power switching signal ZS1 to the hydraulic power switching unit 220 as shown in FIG. 8.

Then the hydraulic power switching unit 220 drives the third directional control valve 220c of the first, second and third directional control valves 220a, 220b and 220c as shown in FIG. 9 on the basis of the hydraulic power switching signal ZS1. The third directional control valve 220c is supplied with oil pressure in which the pressure value ZP is the set value ZP1 from the hydraulic pump via the line 220f, the first directional control valve 220a, the line 220i, the second directional control valve 220b and the line 220k. The oil pressure value ZP is not reduced, and the set value ZP1 is maintained, since the oil supplied to the third directional control valve 220c does not pass through the first and second pressure reducing valves 220d and 220e. The engaging unit 223b of the disc brake 223 as shown in FIG. 8 then holds the disc 223a with a strong power, corresponding to the pressure valve ZP1 of the supplied oil, via the pads 223c to improve the self-holding function of the rotation shaft 202. The clamp power of the engaging unit 223b is controlled by the clamp control program CPR as shown in FIG. 6 to clamp the rotation shaft 202, as explained above.

Even if the cutting power of milling a workpiece acts considerably on the rotation shaft 202 (heavy cutting in particular) by means of a tool rest (not shown) in such a manner that the tool rest is moved and driven via a tool rest control portion and the like in the right and left directions in FIG. 1 and in the directions as shown by the arrows C and D with the rotation shaft 202 fixed, there is no possibility of rotating the rotation shaft 202 in the directions as shown by the arrows ZA and ZB with the cutting power. For this reason, the workpiece is cut without chatter, and a key way and the like are formed on the workpiece with high accuracy.

Where a workpiece is cut rotating the shaft 202 in the directions as shown by the arrows ZA and ZB by C-axis control in order to form a cam groove and the like on a workpiece, the main control portion 207 as shown in FIG. 8 commands the rotation shaft motor controller 219, a tool rest control portion and the like to cut a workpiece while rotating the shaft 202 with C-axis control according to the executable program ZPRO1. When the command is outputted to the tool rest control portion and the like, the cutting type discriminating portion 213 determines, on the basis of the step relating to the cutting movement to be performed from now on, which is written in the executable program ZPRO1, that the cutting type CV is CV2, as shown in FIG. 10, that is, (2) "cutting with the rotation shaft 202 rotating" and A. "rough machining (long depth of cut)"F1. The cutting type discriminating portion 213 obtains the hydraulic power switching signal ZS2 corresponding to the determined cutting type CV2 (A. "rough machining (long depth of cut)") by retrieving the hydraulic power decision table ZT1 as shown in FIG. 10, and outputs the obtained switching signal ZS2 to the hydraulic power switching unit 220, as shown in FIG. 8.

Then, the hydraulic power switching unit 220 as shown in FIG. 8 drives the first and third directional control valves 220a and 220c on the basis of the hydraulic power switching signal ZS2. The first directional control valve 220a connects between the lines 220h and 220i and the third directional control valve 220c connects between the lines 220k and 220m. For this reason, the oil expelled from the hydraulic pump, in which the pressure value ZP is the set value ZP1 inflows into the first pressure reducing valve 220d via the line 220f to reduce the pressure value to ZP2 (<ZP1). Furthermore, in this state, the oil in which the pressure value ZP is ZP2 flows from the first pressure reducing valve 220d into the third directional control valve 220c via the line 220h, the first directional control valve 220a, the line 220i, the second directional control valve 220b and the line 220k, without going through the pressure reducing valve 220e. The engaging unit 223b of the disc brake 223, as shown in FIG. 8, is supplied with the oil in which the pressure value ZP is ZP2 via the third directional control valve 220c and the line 220m. Then the engaging unit 223b holds the disc 223a according to the pressure value ZP2 of the supplied oil, a more weak power in comparison with the case of cutting with the rotation shaft 202 fixed, as described before. For this reason, the rotation of the shaft 202 in the directions as shown by the arrows ZA and ZB is limited by the disc brake 223 to improve the self-holding function.

As a result, there is no possibility of rotating the rotation shaft 202 in the directions as shown by the arrows ZA and ZB inadvertently by the considerable cutting power actuating on the rotation shaft 202 working under the assumption that rough machining is performed on the workpiece by means of a tool installed in a tool rest and by rotating the shaft 202 in the direction as shown by the arrows ZA and ZB with C-axis control in a state where the depth of the cut is long.

Where finishing machining is further performed on a workpiece by rotating the shaft 20 after rough machining is performed on a workpiece by rotating the shaft 202 with C-axis control, the main control portion 207 as shown in FIG. 8 commands the rotation shaft motor controller 219 and the like to perform machining, such as milling, by rotating the shaft 202 according to the executable program ZPRO1. Then the cutting type discriminating portion 213 determines, on the basis of the executable program ZPRO1 read out from the operating portion 217, that the cutting type CV to be performed from now on is CV2, as shown in FIG. 10, that is, (2) "cutting with the rotation shaft 202 rotating" and B. "finishing machining (short depth of cut) F2, and obtains the hydraulic power switching signal ZS corresponding to the cutting type CV2 (B. " finishing machining (short depth of cut) ), that is, ZS3, by retrieving the hydraulic power decision table ZT1, as shown in FIG. 10, to output to the hydraulic power switching unit 220 as shown in FIG. 8 the signal ZS3.

Then the hydraulic switching unit 220 drives the second and third directional control valve 220b and 220c on the basis of the hydraulic power switching signal ZS3. The second directional control valve 220b connects between the lines 220j and 220k and the third directional control valve 220c connects between the lines 220k and 220m. For this reason, the oil expelled from the hydraulic pump, in which the pressure value ZP is the set value ZP1, flows into the second pressure reducing valve 220e via the line 220f, the first directional control valve 220a and the line 220i, without going through the pressure reducing valve 220d, to reduce the pressure value ZP to ZP3 (<ZP2). Moreover, the oil in which the pressure value ZP becomes ZP3 flows from the second pressure reducing valve 220e into the third directional control valve 220c via the line 220j, the second directional control valve 220b and the line 220k. The engaging unit 223b of the disc brake 223, as shown in FIG. 8, is supplied with the oil in which the pressure value ZP is ZP3 via the third directional control valve 220c and the line 202m.

The engaging unit 223b then holds the disc 223 with a more weak power, in comparison with the rough machining as described before, according to the pressure value ZP3 of the supplied oil, to improve the self-holding function of the rotation shaft 202. As a result, there is no possibility of rotating the rotation shaft 202 in the directions a shown by the arrows ZA and ZB with the cutting power acting on the rotation shaft 202 when finishing machining is performed on a workpiece by means of a tool installed in a tool rest rotating the shaft 202 so that the depth of cut may be short. Therefore, a cam groove and the like are formed on a workpiece with high accuracy. Since the depth of cut F is short and the cutting power acting on the rotation shaft 202 is weaker in comparison with the case of the rough machining, as described before, the power to hold the disc 223a of the engaging unit 223b is weakened.

With this arrangement, a brake means, such a the disc brake 223, is provided for the rotation shaft 202. Brake driving control means, such as the hydraulic power switching unit 220, is provided to drive and control the brake means. The brake driving control means drives and controls the brake means according to the machining to be performed, able to change the power while the brake means holds the rotation shaft 202.

Where milling and the like are performed on a workpiece installed on the rotation shaft 202, rotating the shaft 202 with C-axis control, a workpiece can be machined with high accuracy without chatter. The brake means is driven and controlled according to the machining contents to change the self-holding function of the rotation shaft 202 by stages. When indexing the rotation shaft 202, indexing can be performed with high speed and high accuracy by rotating and driving the driving motor 203 directly connected with the rotation shaft 202 with high speed without holding the rotation shaft 202 with the brake means.

The present invention is explained according to the above embodiments. But the embodiments described in the present specification are exemplary, and not to be construed as restrictive. The range of the invention is supported by the attached claims, and is not bound by the description of the embodiments. Accordingly, all modification and changes within the scope of the claims is to be considered with in the range of the present invention.

What is claimed is:

1. A workpiece spindle control unit in a machine tool having a workpiece spindle, comprising:
    a clamping means for clamping engagement with the workpiece spindle to frictionally control or stop the rotation of the workpiece spindle, said clamping means comprising a brake means for braking the rotation of the workpiece spindle; and
    a power adjusting means for adjusting in discrete steps the amount of power used by said clamping means for clamping engagement with the workpiece spindle;
    wherein said clamping means has a brake disc mounted on the workpiece spindle for rotation therewith, and said brake means is disposed so as to be capable of clamping said brake disc from both sides thereof.

2. The workpiece spindle control unit as set forth in claim 1, wherein the workpiece spindle has a spindle motor directly connected therewith.

3. The workpiece spindle control unit as set forth in claim 1, wherein each said brake means comprises a pair of hydraulic cylinders on opposite sides of said brake disc, a brake pad on each said hydraulic cylinder and a return spring for each said hydraulic cylinder.

4. The workpiece spindle control unit as set forth in claim 1, wherein said clamping means is actuated by the pressure of an actuation fluid supplied thereto, and said power adjusting means comprises a pressure adjusting means for adjusting in discrete steps the pressure of said actuation fluid supplied to said clamping means, said clamping means being fluidly connected to said pressure adjusting means for the supply of said actuation fluid therefrom.

5. The workpiece spindle control unit as set forth in claim 4, wherein said pressure adjusting means comprises a pressure reducing valve means for reducing the pressure of actuation fluid received from an actuation fluid source, a first valve means for selecting either reduced pressure actuation fluid from said pressure reducing valve means or actuation fluid from the actuation fluid source to be supplied to said clamping means, and a second valve means for either feeding actuation fluid selected by said first valve means from said first valve means to said clamping means or feeding no actuation fluid to said clamping means.

6. The workpiece spindle control unit as set forth in claim 1, and further comprising supply means for supplying a friction reducing fluid to said clamping means.

7. The workpiece spindle control unit as set forth in claim 2, and further comprising a means for controlling the angular position of said workpiece spindle, said means being connected with said spindle motor.

8. The workpiece spindle control unit as set forth in claim 1, and further comprising a clamping control means for controlling the points in time at which said clamping means engages the workpieces spindle to frictionally control or stop the rotation of the workpiece spindle and said power adjusting means to select the amount of power used by said clamping means for clamping engagement with the workpiece spindle at said points in time.

9. A workpiece spindle control method for a machine tool having a workpiece spindle, comprising:
    providing a clamping means for clamping engagement with the workpiece spindle to frictionally control or stop the rotation of the workpiece spindle, said clamping means comprising brake means for braking the rotation of the workpiece spindle, said clamping means further including a braking surface on the workpiece spindle to be contacted by said brake means;
    applying a first amount of clamping power to said brake means until said brake means are in contact with said braking surface on the workpiece spindle; and
    applying a second amount of clamping power greater than said first amount of clamping power to said brake means after said brake means is in contact with said braking surface on the workpiece spindle.

10. A workpiece spindle control method of claim 9, and further comprising the step of supplying a friction reducing fluid to said clamping means in order to reduce the clamping power of said clamping means when said brake means has said first amount of clamping power applied thereto.

11. A workpiece spindle control method for a machine tool having a workpiece spindle, comprising:
    providing a clamping means for clamping engagement with the workpiece spindle to frictionally control or stop the rotation of the workpiece spindle, said clamping means comprising brake means for braking the rotation of the workpiece spindle;
    applying a first amount of clamping power to said brake means such that said clamping means clampingly engages the workpiece spindle to control the rotation of the workpiece spindle;

applying a second amount of clamping power to said brake means greater than said first amount of clamping power to said brake means after the passage of a predetermined amount of time from the application of the first amount of clamping power.

12. A workpiece spindle control method of claim 11, and further comprising the step of supplying a friction reducing fluid to said clamping means in order to reduce the clamping power of said clamping means when said brake means has said first amount of clamping power applied thereto.

13. A workpiece spindle control unit in a machine tool, comprising:
   a workpiece spindle;
   a workpiece spindle motor having a normal rated operating torque directly connected with said workpiece spindle for driving said workpiece spindle;
   a turning angle detecting means for detecting the turning angle of said workpiece spindle;
   a servo control means for controlling the turning angle of said workpiece spindle by controlling said workpiece spindle motor in response to a signal from said turning angle detecting means;
   a clamping means for clamping engagement with said workpiece spindle to frictionally control or stop reaction of said workpiece spindle; and
   command means for commanding said servo control means to reduce the torque of said workpiece spindle motor below the normal rated operating torque while said clamping means clampingly engages said workpiece spindle to control the rotation of said workpiece spindle.

14. A workpiece spindle control method in a machine tool, comprising:
   providing a workpiece spindle, a workpiece spindle motor having a normal rated operating torque directly connected with said workpiece spindle for driving said workpiece spindle, a turning angle detecting means for detecting the turning angle of said workpiece spindle, a servo control means for controlling the turning angle of said workpiece spindle by controlling said workpiece spindle motor in response to a signal from said turning angle detecting means;
   providing a clamping means for clamping engagement with said workpiece spindle to frictionally control or stop rotation of said workpiece spindle;
   actuating said clamping means such that said workpiece spindle, together with said workpiece motor, are clampingly engaged by said clamping means to control the rotation thereof;
   controlling the turning angle of said workpiece spindle with said servo control means while said workpiece spindle and workpiece spindle motor are being clampingly engaged by said clamping means in response to a signal from said turning angle detecting means to maintain said workpiece spindle fixed at a predetermined angular position; and
   reducing the torque of said workpiece spindle motor below the normal rated operating torque of said workpiece spindle motor, whereby overheating of said workpiece spindle motor is prevented.

15. A workpiece spindle control method in a machine tool, comprising:
   providing a workpiece spindle, a workpiece spindle motor having a normal rated operating torque directly connected with said workpiece spindle for driving said workpiece spindle, a turning angle detecting means for detecting the turning angle of said workpiece spindle, a servo control means for controlling the turning angle of said workpiece spindle by controlling said workpiece spindle motor in response to a signal from said turning angle detecting means;
   holding a workpiece on said workpiece spindle;
   rotating said workpiece spindle together with the workpiece and positioning said workpiece spindle at a predetermined angular position, said workpiece spindle being rotated and positioned by said servo control means driving and controlling said workpiece spindle motor, such that said workpiece can be held fixed at said predetermined angular position for a machining operation;
   clampingly engaging said workpiece spindle when said workpiece spindle is positioned at said predetermined angular position;
   setting a limit to the torque of said workpiece spindle motor to a predetermined amount of torque;
   performing a machining operation on said workpiece; and
   removing the limit to the torque of said workpiece spindle motor and disengaging the clamping engagement of said workpiece spindle after the machining operation on said workpiece is finished.

* * * * *